(12) United States Patent
Smith

(10) Patent No.: US 7,338,378 B1
(45) Date of Patent: Mar. 4, 2008

(54) RETAINER FOR UNIVERSAL JOINT BEARING CUPS

(75) Inventor: Johnny N. Smith, Toledo, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 206 days.

(21) Appl. No.: 10/910,145

(22) Filed: Aug. 3, 2004

(51) Int. Cl.
*F16D 3/41* (2006.01)
(52) U.S. Cl. .................................. 464/14; 464/132
(58) Field of Classification Search ............ 464/11, 464/12, 13, 14, 136, 132, 130
See application file for complete search history.

(56) References Cited

U.S. PATENT DOCUMENTS

| | | | |
|---|---|---|---|
| 3,200,615 A * | 8/1965 | Stokely | |
| 3,204,428 A * | 9/1965 | Stokely | |
| 3,470,711 A * | 10/1969 | Kayser | 464/14 |
| 3,950,834 A | 4/1976 | Pitner | |
| 4,103,512 A * | 8/1978 | McElwain et al. | 464/14 |
| 4,325,593 A | 4/1982 | Mallet | |
| 4,445,875 A * | 5/1984 | Kosuda et al. | 464/14 |
| 4,478,591 A * | 10/1984 | Mangiavacchi | 464/14 |
| 4,637,740 A | 1/1987 | Olschewski et al. | |
| 4,650,440 A * | 3/1987 | Fisher | 464/14 |
| 4,710,150 A | 12/1987 | Mangiavacchi | |
| 5,547,423 A * | 8/1996 | Lindenthal et al. | 464/136 |
| 5,718,635 A | 2/1998 | Park et al. | |
| 5,797,800 A | 8/1998 | Rhoades et al. | |
| 5,813,916 A * | 9/1998 | Lentini et al. | 464/128 |
| 5,865,678 A | 2/1999 | Koedam et al. | |
| 5,989,125 A * | 11/1999 | Lindenthal | |
| 6,095,925 A | 8/2000 | Smith | |
| 6,129,634 A | 10/2000 | Nieman | |
| 6,162,126 A | 12/2000 | Barrett et al. | |
| 6,264,566 B1 | 7/2001 | Nieman et al. | |
| 6,280,335 B1 | 8/2001 | Wehner et al. | |
| 6,336,868 B1 | 1/2002 | Kurecka et al. | |
| 6,386,982 B1 * | 5/2002 | Gille | 464/127 |
| 6,827,649 B2 * | 12/2004 | Menosky et al. | 464/14 |
| 7,037,199 B2 * | 5/2006 | Nelson et al. | 464/14 |
| 2004/0180723 A1 * | 9/2004 | Menosky et al. | 464/130 |
| 2005/0159224 A1 * | 7/2005 | Nelson et al. | 464/14 |

FOREIGN PATENT DOCUMENTS

GB  2102914  2/1983

* cited by examiner

*Primary Examiner*—Daniel P. Stodola
*Assistant Examiner*—Daniel J. Mills
(74) *Attorney, Agent, or Firm*—MacMillan, Sobanski & Todd, LLC

(57) ABSTRACT

A journal cross includes a trunnion having a lubricant passageways formed therethrough. A retainer is disposed in the lubricant passageway and includes a body portion and a lip portion. The body portion of the retainer is retained within the lubricant passageway in a press fit relationship, and the lip portion of the retainer extends inwardly into the lubricant passageway. The bearing cup includes a thrust washer that is retained therein by needle bearings and a seal assembly. The thrust washer includes a projection that extends radially inwardly within the lubricant passageway and has one or more fingers provided thereon. When the bearing cup is installed on the trunnion, the fingers of the thrust washer cooperate with the lip portion of the retainer to retain the bearing cup on the trunnion, such as during shipment from one manufacturing location to another.

19 Claims, 2 Drawing Sheets

RETAINER FOR UNIVERSAL JOINT BEARING CUPS

BACKGROUND OF THE INVENTION

This invention relates in general to universal joints, such as are commonly used in vehicular drive train systems. In particular, this invention relates to an improved structure for quickly, inexpensively, and reliably retaining a pair of bearing cups on an opposed pair of trunnions of a journal cross for a universal joint, such as during shipment from one manufacturing location to another.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Each of the universal joints typically includes a journal cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. In the front universal joint of the above-described driveshaft assembly, the bearing cups supported on the first opposed pair of the trunnions on a front journal cross are connected to the front end fitting of the driveshaft assembly, while the bearing cups supported on the second opposed pair of the trunnions on the front journal cross are connected to an end fitting secured to the output shaft of the engine/transmission assembly. Similarly, in the rear universal joint of the above-described driveshaft assembly, the bearing cups supported on the first opposed pair of the trunnions on a rear journal cross are connected to the rear end fitting of the driveshaft assembly, while the bearing cups supported on the second opposed pair of the trunnions on the rear journal cross are connected to an end fitting secured to the input shaft of the axle assembly.

Frequently, the driveshaft assembly (including the driveshaft tube, the front and rear end fittings, and the journal crosses for the front and rear universal joints) is assembled at a first manufacturing location, then shipped as a unit to a second manufacturing location for assembly with the other components of the vehicle drive train system. In such an assembly process, the bearing cups supported on the first opposed pairs of the trunnions on both the front and rear journal crosses are connected to the associated front and rear end fittings of the driveshaft assembly. However, the bearing cups supported on the second opposed pairs of the trunnions on the front and rear journal crosses are not positively retained thereon. As a result, these non-retained bearing cups can move apart from one another on the journal crosses, such as when the respective universal joints are purged with lubricant. Also, these non-retained bearing cups can be inadvertently removed from the journal crosses and become lost during shipment from the first manufacturing location to the second manufacturing location.

To address this, a variety of straps are known in the art for positively retaining these bearing cups on their associated journal crosses. However, known retainer straps have been found to be somewhat time-consuming to install and remove. Also, known retainer straps have been found to be relatively expensive. Lastly, in some instances, known retainer straps have been found themselves to become dislodged from the bearing cups during shipment. Accordingly, it would be desirable to provide an improved structure for quickly, inexpensively, and reliably retaining a pair of bearing cups on an opposed pair of trunnions of a journal cross for a universal joint, such as during shipment from one manufacturing location to another.

SUMMARY OF THE INVENTION

This invention relates to an improved structure for quickly, inexpensively, and reliably retaining a pair of bearing cups on an opposed pair of trunnions of a journal cross for a universal joint, such as during shipment from one manufacturing location to another. The journal cross includes a trunnion having a lubricant passageway formed therethrough. A retainer is disposed in the lubricant passageway and includes a body portion and a lip portion. The body portion of the retainer is retained within the lubricant passageway in a press fit relationship, and the lip portion of the retainer extends inwardly into the lubricant passageway. The bearing cup includes a thrust washer that is retained therein by needle bearings and a seal assembly. The thrust washer includes a projection that extends radially inwardly within the lubricant passageway and has one or more fingers provided thereon. When the bearing cup is installed on the trunnion, the fingers of the thrust washer cooperate with the lip portion of the retainer to retain the bearing cup on the trunnion, such as during shipment from one manufacturing location to another.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
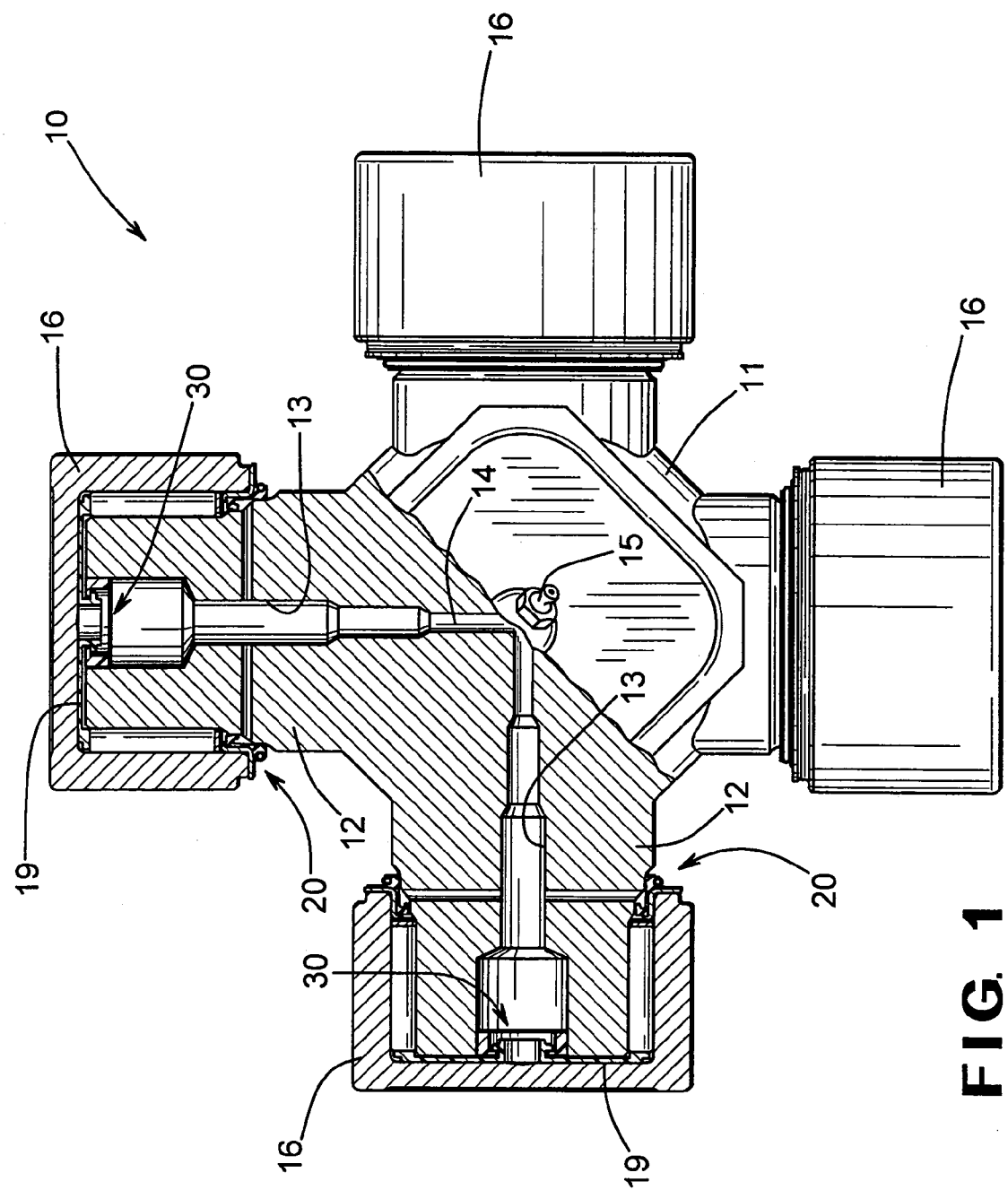
FIG. 1 is an elevational view, partially in cross section, of a cross for a universal joint including a bearing retainer in accordance with this invention.

Referring now to the drawings, there is illustrated in FIG. 1 a journal cross, indicated generally at 10, that is generally conventional in the art. The journal cross 10 is adapted to form a portion of a conventional universal joint (not shown), such as is commonly used in vehicular and other types of drive train systems. However, the scope of this invention is not intended to be limited for use with vehicular drive train systems or in drive train systems in general. On the contrary, as will become apparent below, this invention may be used in any desired environment for the purposes described below.

The illustrated journal cross 10 includes a central body portion 11 having a plurality of trunnions 12 extending outwardly therefrom. In the illustrated embodiment, four of such trunnions 12 are formed integrally with the body portion 11 of the journal cross 10. The illustrated trunnions 12 are disposed at right angles relative to one another and are oriented so as to lie in a single plane. Each of the illustrated trunnions 12 is generally hollow and cylindrical in shape and extends outwardly from the central body portion 11 along respective longitudinal axes, although such is not required. Each of the illustrated trunnions 12 has a lubricant passageway 13 formed therein that extends radially outwardly from a central cavity 14 formed in the central body portion 11. The lubricant passageways 13 extend radially outwardly from the central cavity 14 through the respective trunnions 12. However, the lubricant passageways 13 can be formed having any desired size or shape. Furthermore, this invention contemplates that the lubricant passageways 13 may be embodied as simple counterbores formed in the trunnions 12, extending inwardly from the axially outer end surfaces thereof (see 12c in FIG. 2), but not communicating with each other or with the central cavity 14.

A lubrication fitting 15 is mounted on the central body portion 11 of the journal cross 10 and communicates with the central cavity 14. The lubrication fitting 15 can, for example, be a conventional check valve that allows lubricant (not shown) to be injected therethrough under pressure into the central cavity 14, while preventing such lubricant from leaking outwardly therefrom. A bearing cup, indicated generally at 16, is rotatably supported on the end of each of the trunnions 12. The structures by which the bearing cups 16 are rotatably supported on the ends of the trunnions 12 are described in detail below.

Figure 2:
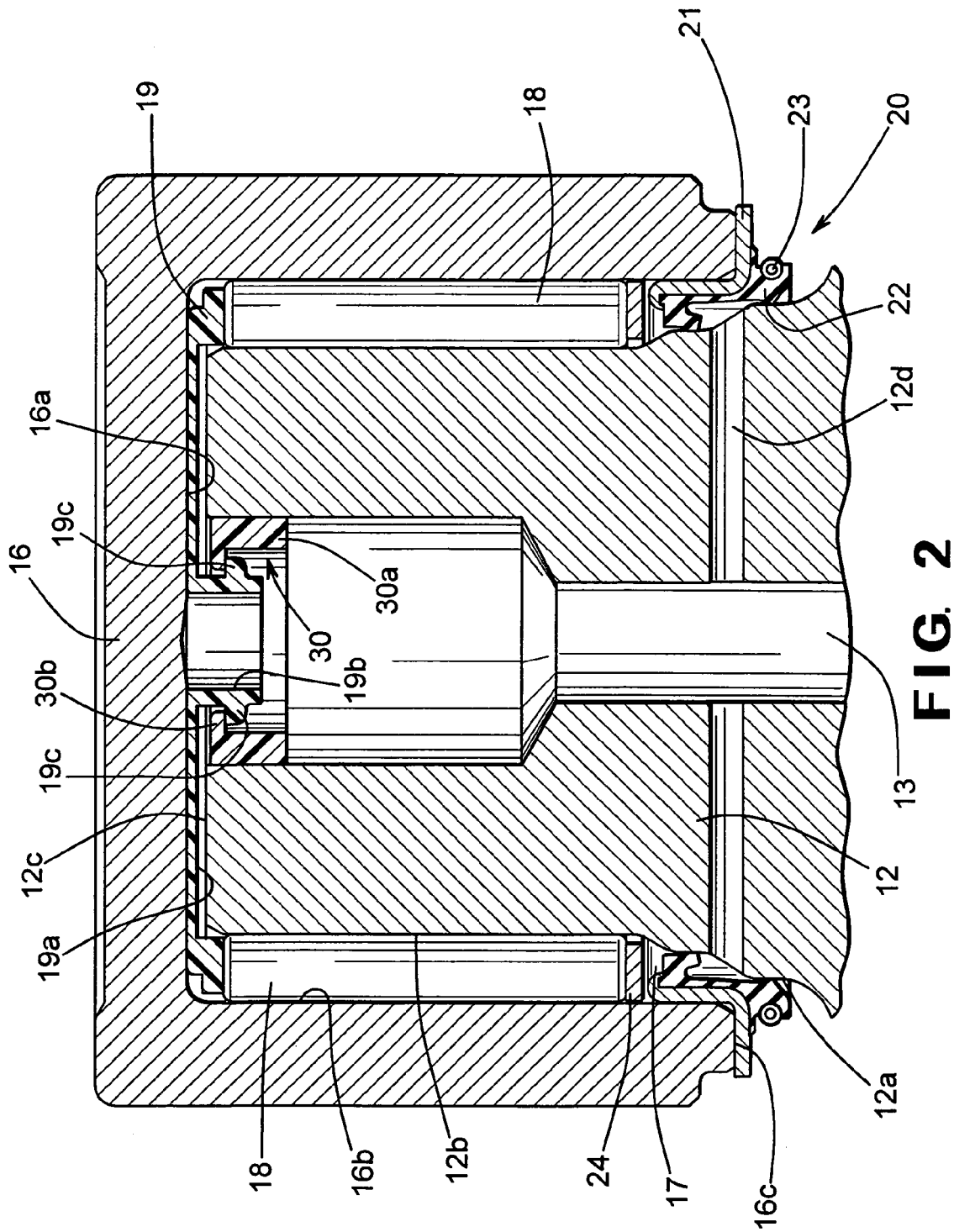
FIG. 2 is an enlarged sectional elevational view of one of the trunnions of the cross illustrated in FIG. 1 showing the bearing retainer in accordance with this invention.

The structure of one of the trunnions 12 of the journal cross 10 is illustrated in more detail in FIG. 2. As shown therein, the illustrated trunnion 12 includes a generally cylindrical sealing surface 12a that extends radially outwardly from the body portion 11 of the cross 10 and a generally cylindrical bearing surface 12b that extends radially outwardly from the cylindrical sealing surface 12a. The bearing surface 12b of the trunnion 12 terminates at an axially outer end surface 12c. The lubricant passageway 13 extends through the trunnion 12 to the outer end surface 12c thereof. The illustrated trunnion 12 also has one or more lateral passageway 12d formed therein for a purpose that will be explained below.

The bearing cup 16 is conventional in the art and is generally hollow and cylindrical in shape, including a closed end 16a, an inner cylindrical bearing surface 16b, and an opened end 16c. When mounted about the trunnion 12, the closed end 16a of the bearing cup 16 is disposed adjacent to the axially outer end surface 12c of the trunnion 12. At the same time, the inner bearing surface 16b of the bearing cup 16 is disposed concentrically about the outer bearing surface 12b of the trunnion 12. The inner diameter defined by the inner bearing surface 16b of the bearing cup 16 is somewhat larger than the outer diameter defined by the outer bearing surface 12b of the trunnion 12. Consequently, an annular region or space 17 is defined extending between the inner bearing surface 16b of the bearing cup 16 and the outer bearing surface 12b of the trunnion 12. A plurality of conventional roller bearings 18 (only two are illustrated) are disposed in the annular space 17 in a circumferential array between the inner bearing surface 16b of the bearing cup 16 and the outer bearing surface 12b of the trunnion 12. As is well known, the roller bearings 18 are provided to facilitate rotational movement of the bearing cup 16 relative to the trunnion 12 during operation.

An annular thrust washer 19 is disposed between the axially outer end surface 12c of the trunnion 12 and the closed end 16a of the bearing cup 16. The thrust washer 19 is provided to reduce the amount of friction between the trunnion 12 and the associated bearing cup 16 when relative rotation therebetween occurs. The thrust washer 19 can also reduce the amount of friction between the roller bearings 18 and the bearing cup 16 and take up any looseness between the bearing cup 16 and the trunnion 12. A plurality of grooves 19a is formed in the radially inwardly facing surface of the thrust washer 19. The grooves 19a are conventional in the art and provide fluid communication between the lubricant passageway 13 within the trunnion 12 and the annular space 17 containing the bearings 18. As a result, when lubricant is injected into the central cavity 14 of the central body portion 12 of the cross 10, such lubricant flows radially outwardly through the lubricant passageway 13, laterally across the outer end surface 12c of the trunnion 12 through the grooves 19a provided in the thrust washer 19, and radially inwardly into the annular space 17 containing the bearings 18.

Additionally, the thrust washer 19 has a projection 19b formed thereon that extends radially inwardly within the lubricant passageway 13 formed through the trunnion 12. In the illustrated embodiment, the projection 19b is generally hollow and cylindrical in shape and extends co-axially within the lubricant passageway 13. However, the projection 19b may be formed having any desired configuration. One or more fingers 19c are provided on the projection 19b. In the illustrated embodiment, four of such fingers 19c (only two are illustrated) are provided that extend laterally outwardly in opposite directions from the projection 19b. However, any desired number of fingers 19c may be provided on the projection 19b, and such fingers 19c may extend in any desired direction or directions. The purpose for the projection 19b and the fingers 19c will be explained below.

An annular seal assembly, indicated generally at 20, is provided about the open end 16c of each of the bearing cups 16. The seal assembly 20 is conventional in the art and includes a metallic support ring 21, an elastomeric seal 22, and a garter spring 23. The illustrated support ring 21 is generally S-shaped in cross section, although such is not required. The central portion of the support ring 21 has an outer diameter that is slightly larger than an inner diameter defined by the inner bearing surface 16b of the bearing cup 16. Therefore, the support ring 21 can be pressed into the inner bearing surface 16b of the bearing cup 16 and be retained in the opened end 16c of the bearing cup 16 by friction. A retaining ring 24 may be provided between the support ring 21 and the bearings 18, although such is not required. The elastomeric seal 22 is attached to the support ring 21 by any conventional means, such as by adhesive bonding. The garter spring 23 positively urges the elastomeric seal 22 into sealing engagement with the cylindrical sealing surface 12a of the trunnion 12. The lateral passageways 12d provide fluid communication between the seal assembly 20 and the lubricant passageway 13 formed in the trunnion 12. When the seal assembly 20 is installed within the bearing cup 16 as shown in FIG. 2, the retaining ring 24, the bearings 18, and the thrust washer 19 are all positively retained within the bearing cup 16.

A retainer, indicated generally at 30, is disposed within the lubricant passageway 13 formed through the trunnion 12. In the illustrated embodiment, the retainer 30 includes a body portion 30a that is formed from a plastic material and is generally hollow and cylindrical in shape. However, the body portion 30a of the retainer 30 may be formed from any desired material and may have any desired shape. Preferably, the body portion 30a of the illustrated retainer 30 has an outer cylindrical surface that is slightly larger in diameter than an inner diameter defined by the inner cylindrical surface of the lubricant passageway 13. Thus, before the bearing cup 16 (including the retaining ring 24, the bearings 18, and the thrust washer 19) is installed on the trunnion 12, the body portion 30a of the retainer 30 can be press fit within the lubricant passageway 13 and retained therein by frictional engagement, as shown in FIG. 2. However, the retainer 30 can be retained within the lubricant passageway 13 in any other desired manner.

The retainer 30 also has a lip portion 30b provided thereon that extends inwardly within the lubricant passageway 13 formed through the trunnion 12. In the illustrated embodiment, the lip portion 30b is also formed from a plastic material (preferably integral with the body portion 30a, although such is not required) and is generally annular in shape, extending radially inwardly from the hollow cylindrical body portion 30a of the retainer 30. However, the lip portion 30b of the retainer 30 can be formed from any desired material and may have any desired shape. For example, the lip portion 30b of the retainer 30 may be embodied as a plurality of individual lip portions (not shown) that extend inwardly from the body portion 30a of the retainer 30.

As mentioned above, the retainer 30 is initially disposed within the lubricant passageway 13 formed through the trunnion 12 so as to be retained therein. Then, the bearing cup 16 (containing the retaining ring 24, the bearings 18, and the thrust washer 19) is co-axially aligned with the end of the trunnion 12 and moved telescopically thereover. During such movement, the fingers 19c of the thrust washer 19 initially abut the lip portion 30b of the retainer 30. Either or both of the fingers 19c of the thrust washer 19 and the lip portion 30b of the retainer 30 are formed in such a manner as to be sufficiently flexible as to allow the fingers 19c of the thrust washer 19 to move axially inwardly past the lip portion 30b of the retainer 30, as shown in FIG. 2. If desired, either or both of the fingers 19c of the thrust washer 19 and the lip portion 30b of the retainer 30 can be formed have curved or tapered surfaces to facilitate the axial movement of the fingers 19c of the thrust washer 19 past the lip portion 30b of the retainer 30. Regardless, once the fingers 19c of the thrust washer 19 have moved axially past the lip portion 30b of the retainer 30, the thrust washer 19 is positively retained on the trunnion 12. Consequently, the bearing cup 16 is also retained on the trunnion 12.

Although this invention has been described and illustrated in the context of the thrust washer 19 being retained on both the trunnion 12 and the bearing cup 16, it will be appreciated that the bearing cup 16 can be retained on the trunnion 12 by other structures. For example, the bearing cup 16 can be retained on the trunnion 12 by any other retaining component that is itself retained on both the trunnion 12 and the bearing cup 16. In other words, the component that retains the bearing cup 16 on the trunnion 12 need not also function as a thrust washer 19. Furthermore, it will be appreciated that the bearing cup 16 itself can have one or more fingers formed integrally therewith that cooperate directly with the retainer 30 disposed within the lubricant passageway 13 formed through the trunnion 12, thereby eliminating the need for a separate retaining component.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A journal cross and bearing cup assembly comprising:
a journal cross including a trunnion having a passageway defining an inner surface;
a retainer disposed completely within said passageway and engaging said inner surface of said passageway to retain said retainer on said trunnion; and
a bearing cup supported on said journal cross and engaging said retainer to positively retain said bearing cup on said journal cross.

2. The journal cross and bearing cup assembly defined in claim 1 wherein said retainer is retained on said trunnion in a press fit relationship.

3. The journal cross and bearing cup assembly defined in claim 1 wherein said retainer includes a body portion that is retained on said trunnion and a lip portion, and wherein said bearing cup engages said lip portion of said retainer.

4. The journal cross and bearing cup assembly defined in claim 3 wherein said lip portion of said retainer is generally annular in shape.

5. The journal cross and bearing cup assembly defined in claim 3 wherein said lip portion of said retainer extends inwardly within said passageway.

6. The journal cross and bearing cup assembly defined in claim 1 wherein said bearing cup includes a component retained thereon, and wherein said component engages said retainer.

7. The journal cross and bearing cup assembly defined in claim 6 wherein said component includes a finger that engages said retainer.

8. The journal cross and bearing cup assembly defined in claim 6 wherein said component includes a plurality of fingers that each engage said retainer.

9. The journal cross and bearing cup assembly defined in claim 6 wherein said component includes a projection that extends within said passageway and has a finger that engages said retainer.

10. The journal cross and bearing cup assembly defined in claim 6 wherein said component includes a projection that extends within said passageway and has a plurality of fingers that each engage said retainer.

11. The journal cross and bearing cup assembly defined in claim 6 wherein said component is a thrust washer that includes a portion that extends between an outer end of said trunnion and an inner end of said bearing cup.

12. The journal cross and bearing cup assembly defined in claim 1 wherein said retainer includes a body portion that is retained on said trunnion and a lip portion, and wherein said bearing cup includes a component retained thereon, and wherein said component engages said lip of said retainer to positively retain said bearing cup on said journal cross.

13. The journal cross and bearing cup assembly defined in claim 12 wherein said lip portion of said retainer is generally annular in shape.

14. The journal cross and bearing cup assembly defined in claim 12 wherein said lip portion of said retainer extends inwardly within said passageway.

15. The journal cross and bearing cup assembly defined in claim 12 wherein said component includes a finger that engages said lip of said retainer.

16. The journal cross and bearing cup assembly defined in claim 12 wherein said component includes a plurality of fingers that each engage said lip of said retainer.

17. The journal cross and bearing cup assembly defined in claim 12 wherein said component includes a projection that extends within said passageway and has a finger that engages said lip of said retainer.

18. The journal cross and bearing cup assembly defined in claim 12 wherein said component includes a projection that extends within said passageway and has a plurality of fingers that each engage said lip of said retainer.

19. The journal cross and bearing cup assembly defined in claim 12 wherein said component is a thrust washer that includes a portion that extends between an outer end of said trunnion and an inner end of said bearing cup.

* * * * *